US012771651B2

(12) United States Patent
Wang et al.

(10) Patent No.: US 12,771,651 B2
(45) Date of Patent: Oct. 20, 2026

(54) SEMI-PERSISTENT SCHEDULING ENHANCEMENT

(71) Applicant: Nokia Technologies Oy, Espoo (FI)

(72) Inventors: Yonggang Wang, Shanghai (CN); Hua Chao, Shanghai (CN); Zexian Li, Espoo (FI); Ping-Heng Kuo, Cambridge (GB)

(73) Assignee: Nokia Technologies Oy, Espoo (FI)

( * ) Notice: Subject to any disclaimer, the term of this patent is extended or adjusted under 35 U.S.C. 154(b) by 332 days.

(21) Appl. No.: 18/578,596

(22) PCT Filed: Jul. 20, 2021

(86) PCT No.: PCT/CN2021/107244

§ 371 (c)(1),
(2) Date: Jan. 11, 2024

(87) PCT Pub. No.: WO2023/000155

PCT Pub. Date: Jan. 26, 2023

(65) Prior Publication Data

US 2024/0333656 A1 Oct. 3, 2024

(51) Int. Cl.
*H04L 47/70* (2022.01)
*H04W 52/02* (2009.01)
*H04W 72/11* (2023.01)

(52) U.S. Cl.
CPC ......... *H04L 47/70* (2013.01); *H04W 52/0229* (2013.01); *H04W 72/11* (2023.01)

(58) Field of Classification Search
CPC .... H04L 47/70; H04W 72/11; H04W 52/0229
(Continued)

(56) References Cited

U.S. PATENT DOCUMENTS 8,175,050 B2 * 5/2012 Meylan ................. H04W 76/28 370/336
8,363,611 B2 * 1/2013 Ho ........................ H04W 72/23 370/341
(Continued)

FOREIGN PATENT DOCUMENTS

CN 108307502 A 7/2018
EP 2315486 A1 * 4/2011 ............ H04W 72/20
(Continued)

OTHER PUBLICATIONS

Extended European Search Report received for corresponding European Patent Application No. 21950421.4, dated Feb. 11, 2025, 8 pages.
(Continued)

*Primary Examiner* — Melvin H Pollack
(74) *Attorney, Agent, or Firm* — McCarter & English LLP

(57) ABSTRACT

Various example embodiments relate to methods and apparatus supporting semi-persistent scheduling enhancement. A terminal device in a communication network may comprise at least one processor and at least one memory having computer program code stored thereon. The at least one memory and the computer program code may be configured to, with the at least one processor, cause the terminal device to receive from a network device in the communication network, allocation of first resources for a traffic flow of a service provided via the communication network, receive on the first resources a message indicating second resources allocated for transmission of at least one packet in the traffic flow of the service, and receive on the second resources, the at least one packet in accordance with the message.

20 Claims, 6 Drawing Sheets

(58) Field of Classification Search
USPC .......... 370/230
See application file for complete search history.

(56) References Cited

U.S. PATENT DOCUMENTS

| | | | | |
|---|---|---|---|---|
| 8,432,845 | B2 * | 4/2013 | Yu | H04W 72/23<br>370/329 |
| 8,837,389 | B2 * | 9/2014 | Kuo | H04W 72/23<br>370/329 |
| 9,462,627 | B2 * | 10/2016 | Majjigi | H04W 72/23 |
| 10,321,477 | B2 * | 6/2019 | Lim | H04W 72/52 |
| 10,798,726 | B2 * | 10/2020 | Lee | H04W 36/0055 |
| 11,166,298 | B2 * | 11/2021 | Lee | H04W 28/0278 |
| 11,963,167 | B2 * | 4/2024 | Ahmed | H04L 1/1671 |
| 11,997,606 | B2 * | 5/2024 | Zhou | H04W 76/27 |
| 12,075,356 | B2 * | 8/2024 | Islam | H04W 76/28 |
| 12,089,220 | B2 * | 9/2024 | Zhou | H04W 52/0206 |
| 12,093,100 | B2 * | 9/2024 | Garg | G06F 1/26 |
| 12,101,763 | B2 * | 9/2024 | Islam | H04W 72/23 |
| 12,149,487 | B2 * | 11/2024 | Chae | H04L 5/1469 |
| 12,170,960 | B2 * | 12/2024 | Shrivastava | H04W 52/0235 |
| 12,177,777 | B2 * | 12/2024 | Ye | H04W 52/0229 |
| 12,232,129 | B2 * | 2/2025 | Li | H04W 72/1263 |
| 12,244,456 | B2 * | 3/2025 | Cirik | H04B 7/06964 |
| 12,250,707 | B2 * | 3/2025 | Bangolae | H04W 76/27 |
| 12,255,846 | B2 * | 3/2025 | Zhang | H04L 1/1822 |
| 12,267,824 | B2 * | 4/2025 | Rossbach | H04W 72/535 |
| 12,284,666 | B2 * | 4/2025 | Li | H04W 72/542 |
| 12,295,056 | B2 * | 5/2025 | Ryu | H04W 76/34 |
| 12,302,409 | B2 * | 5/2025 | Manolakos | H04W 74/0866 |
| 12,317,325 | B2 * | 5/2025 | Lim | H04W 28/06 |
| 12,363,686 | B2 * | 7/2025 | Bangolae | H04W 72/04 |
| 12,414,133 | B2 * | 9/2025 | Miao | H04W 72/231 |
| 12,425,890 | B2 * | 9/2025 | Alfarhan | H04W 24/08 |
| 12,477,541 | B2 * | 11/2025 | Di Girolamo | H04W 72/1263 |
| 12,513,714 | B2 * | 12/2025 | Guo | H04W 72/25 |
| 2016/0119969 | A1 * | 4/2016 | Vajapeyam | H04W 24/10<br>370/329 |
| 2018/0049217 | A1 | 2/2018 | Dinan et al. | |
| 2020/0351937 | A1 * | 11/2020 | Lee | H04W 72/20 |
| 2020/0367182 | A1 | 11/2020 | Zou et al. | |
| 2020/0383127 | A1 | 12/2020 | Zhu et al. | |
| 2021/0029674 | A1 | 1/2021 | Uchiyama et al. | |
| 2021/0105762 | A1 | 4/2021 | Pezeshki et al. | |
| 2024/0260062 | A1 * | 8/2024 | Zhou | H04L 1/1896 |

FOREIGN PATENT DOCUMENTS

| | | | | |
|---|---|---|---|---|
| EP | 3668235 | A1 * | 6/2020 | H04L 5/001 |
| JP | 7649849 | B2 * | 3/2025 | H04W 24/08 |
| WO | WO-2011123978 | A1 * | 10/2011 | H04W 72/23 |
| WO | 2019/149371 | A1 | 8/2019 | |
| WO | 2019/243249 | A1 | 12/2019 | |
| WO | WO-2024232737 | A1 * | 11/2024 | H04W 72/331 |

OTHER PUBLICATIONS

"Potential Enhancements for XR", 3GPP TSG RAN WG1 #105-e, R1-2104704, Agenda: 8.14.4, Qualcomm Incorporated, May 10-27, 2021, 12 pages.

"Challenges and potential enhancements of XR", 3GPP TSG RAN WG1 #104b-e, R1-2102549, Agenda: 8.14.4, vivo, Apr. 12-20, 2021, 8 pages.

"3rd Generation Partnership Project; Technical Specification Group Radio Access Network; NR; Medium Access Control (MAC) protocol specification (Release 16)", 3GPP TS 38.321, V16.4.0, Mar. 2021, pp. 1-157.

"Revised SID on XR Evaluations for NR", 3GPP TSG RAN Meeting #91e, RP-210460, Agenda: 9.6.5, Qualcomm, Mar. 16-26, 2021, 6 pages.

"RAN1 Chairman's Notes", 3GPP TSG RAN WG1 Meeting #104-e, Jan. 25-Feb. 5, 2021, 159 pages.

"Potential enhancements for better XR support over NR", 3GPP TSG RAN WG1 #104-bis-e, R1-2102830, Agenda: 8.14.4, Nokia, Apr. 12-20, 2021, 5 pages.

"3rd Generation Partnership Project; Technical Specification Group Services and System Aspects; Service requirements for the 5G system; Stage 1 (Release 18)", 3GPP TS 22.261, V18.2.0, Mar. 2021, 85 pages.

"Email discussion for XR traffic models and KPIs", 3GPP TSG-RAN WG1 Meeting #104-e, R1-21xxxxx, Agenda: 8.14.1, Qualcomm, Apr. 12-20, 2021, pp. 1-34.

"Email discussion on Initial Evaluation Results for XR over NR", 3GPP TSG-RAN WG1 Meeting #104-e, R1-21xxxxx, Agenda: 8.14.1, Qualcomm, Apr. 12-20, 2021, pp. 1-32.

International Search Report and Written Opinion received for corresponding Patent Cooperation Treaty Application No. PCT/CN2021/107244, dated Apr. 20, 2022, 9 pages.

"On configuration aspects for multiple SPS and CG", 3GPP TSG-RAN WG2 #106, Tdoc R2-1906838, Agenda: 11.7.2.2, Ericsson, May 13-17, 2019, 4 pages.

* cited by examiner

SEMI-PERSISTENT SCHEDULING ENHANCEMENT

RELATED APPLICATION

This application claims priority to PCT Patent Application No. PCT/CN2021/107244, filed Jul. 20, 2021, and entitled "SEMI-PERSISTENT SCHEDULING ENHANCEMENT", which is incorporated herein by reference in its entirety.

TECHNICAL FIELD

Various example embodiments described herein generally relate to communication technologies, and more particularly, to methods and devices supporting semi-persistent scheduling enhancement to accommodate packet arrival time jitter.

BACKGROUND

Certain abbreviations that may be found in the description and/or in the figures are herewith defined as follows:

AR Augmented Reality
C-DRX Connected Discontinuous Reception
CE Control Element
DCI Downlink Control Information
eMBB Enhanced Mobile Broadband
gNB next Generation Node-B
MAC Medium Access Control
mMTC massive Machine Type Communications
MR Mixed Reality
NR New Radio
PDB Propagation Delay Budget
PDCCH Physical Downlink Control Channel
PDSCH Physical Downlink Shared Channel
PDU Protocol Data Unit
RRC Radio Resource Control
SPS Semi-Persistent Scheduling
URLLC Ultra Reliable Low Latency Communications
VR Virtual Reality
WUS Wake-UP Signal
XR eXtended Reality eXtended Reality (XR) is an umbrella term referring to various real and virtual combined environments and interactions generated by computer technologies, encompassing such as Augmented Reality (AR), Mixed Reality (MR) and Virtual Reality (VR). XR applications typically require a high throughput and a low latency. 5G New Radio (NR) is designed for scenarios of enhanced Mobile Broadband (eMBB), Ultra-Reliable Low Latency Communications (URLLC) and massive Machine Type Communications (mMTC). It is expected that 5G NR would support XR applications.

SUMMARY

A brief summary of exemplary embodiments is provided below to provide basic understanding of some aspects of various embodiments. It should be noted that this summary is not intended to identify key features of essential elements or define scopes of the embodiments, and its sole purpose is to introduce some concepts in a simplified form as a preamble for a more detailed description provided below.

In a first aspect, an example embodiment of a terminal device in a communication network is provided. The terminal device may comprise at least one processor and at least one memory. The at least one memory includes computer program code stored thereon. The at least one memory and the computer program code may be configured to, with the at least one processor, cause the terminal device to receive from a network device in the communication network allocation of first resources for a traffic flow of a service provided via the communication network, receive on the first resources a message indicating second resources allocated for transmission of at least one packet in the traffic flow of the service, and receive on the second resources the at least one packet in accordance with the message.

In a second aspect, an example embodiment of a network device in a communication network is provided. The network device may comprise at least one processor and at least one memory. The at least one memory includes computer program code stored thereon. The at least one memory and the computer program code may be configured to, with the at least one processor, cause the network device to allocate first resources for a traffic flow of a service provided via the communication network to a terminal device in the communication network, allocate second resources for transmission of at least one packet in the traffic flow, transmit to the terminal device on the first resources a message indicating the second resources allocated for the transmission of the at least one packet, and transmit to the terminal device on the second resources the at least one packet in accordance with the message.

In a third aspect, an example embodiment of a method implemented at a terminal device in a communication network is provided. The method may comprise receiving from a network device in the communication network allocation of first resources for a traffic flow of a service provided via the communication network, receiving on the first resources a message indicating second resources allocated for transmission of at least one packet in the traffic flow of the service, and receiving on the second resources the at least one packet in accordance with the message.

In a fourth aspect, an example embodiment of a method implemented at a network device in a communication network is provided. The method may comprise allocating first resources for a traffic flow of a service provided via the communication network to a terminal device in the communication network, allocating second resources for transmission of at least one packet in the traffic flow, transmitting to the terminal device on the first resources a message indicating the second resources allocated for the transmission of the at least one packet, and transmitting to the terminal device on the second resources the at least one packet in accordance with the message.

In a fifth aspect, an example embodiment of an apparatus in a communication network is provided. The apparatus may comprise means for receiving from a network device in the communication network allocation of first resources for a traffic flow of a service provided via the communication network, means for receiving on the first resources a message indicating second resources allocated for transmission of at least one packet in the traffic flow of the service, and means for receiving on the second resources the at least one packet in accordance with the message.

In a sixth aspect, an example embodiment of an apparatus in a communication network is provided. The apparatus may comprise means for allocating first resources for a traffic flow of a service provided via the communication network to a terminal device in the communication network, means for allocating second resources for transmission of at least one packet in the traffic flow, means for transmitting to the terminal device on the first resources a message indicating the second resources allocated for the transmission of the at least one packet, and means for transmitting to the terminal device on the second resources the at least one packet in accordance with the message.

In a seventh aspect, an example embodiment of a computer program is provided. The computer program may comprise instructions stored on a computer readable medium. The instructions may, when executed by at least one processor of a terminal device in a communication network, cause the terminal device to receive from a network device in the communication network allocation of first resources for a traffic flow of a service provided via the communication network, receive on the first resources a message indicating second resources allocated for transmission of at least one packet in the traffic flow of the service, and receive on the second resources the at least one packet in accordance with the message.

In an eighth aspect, an example embodiment of a computer program is provided. The computer program may comprise instructions stored on a computer readable medium. The instructions may, when executed by at least one processor of a network device in a communication network, cause the network device to allocate first resources for a traffic flow of a service provided via the communication network to a terminal device in the communication network, allocate second resources for transmission of at least one packet in the traffic flow, transmit to the terminal device on the first resources a message indicating the second resources allocated for the transmission of the at least one packet, and transmit to the terminal device on the second resources the at least one packet in accordance with the message.

Other features and advantages of the example embodiments of the present disclosure will also be apparent from the following description of specific embodiments when read in conjunction with the accompanying drawings, which illustrate, by way of example, the principles of example embodiments of the present disclosure.

BRIEF DESCRIPTION OF THE DRAWINGS

Some example embodiments will now be described, by way of non-limiting examples, with reference to the accompanying drawings.

Throughout the drawings, same or similar reference numbers indicate same or similar elements. A repetitive description on the same elements would be omitted.

DETAILED DESCRIPTION

Herein below, some example embodiments are described in detail with reference to the accompanying drawings. The following description includes specific details for the purpose of providing a thorough understanding of various concepts. However, it will be apparent to those skilled in the art that these concepts may be practiced without these specific details. In some instances, well known circuits, techniques and components are shown in block diagram form to avoid obscuring the described concepts and features.

As used herein, the term "network device" refers to any suitable entities or devices that can provide cells or coverage, through which the terminal device can access the network or receive services. The network device may be commonly referred to as a base station. The term "base station" used herein can represent a node B (NodeB or NB), an evolved node B (eNodeB or eNB), or a gNB or an ng-eNB. The base station may be embodied as a macro base station, a relay node, or a low power node such as a pico base station or a femto base station. The base station may consist of several distributed network units, such as a central unit (CU), one or more distributed units (DUs), one or more remote radio heads (RRHs) or remote radio units (RRUs). The number and functions of these distributed units depend on the selected split RAN architecture.

As used herein, the term "terminal device" or "user equipment" (UE) refers to any entities or devices that can wirelessly communicate with the network devices or with each other. Examples of the terminal device can include a mobile phone, a mobile terminal, a mobile station, a subscriber station, a portable subscriber station, an access terminal, a computer, a wearable device, an on-vehicle communication device, a machine type communication (MTC) device, an internet of things (IoT) device, an internet of everything (IoE) device, a device-to-device (D2D) communication device, a vehicle to everything (V2X) communication device, a sensor and the like. The term "terminal device" can be used interchangeably with UE, a user terminal, a mobile terminal, a mobile station, or a wireless device.

Figure 1:
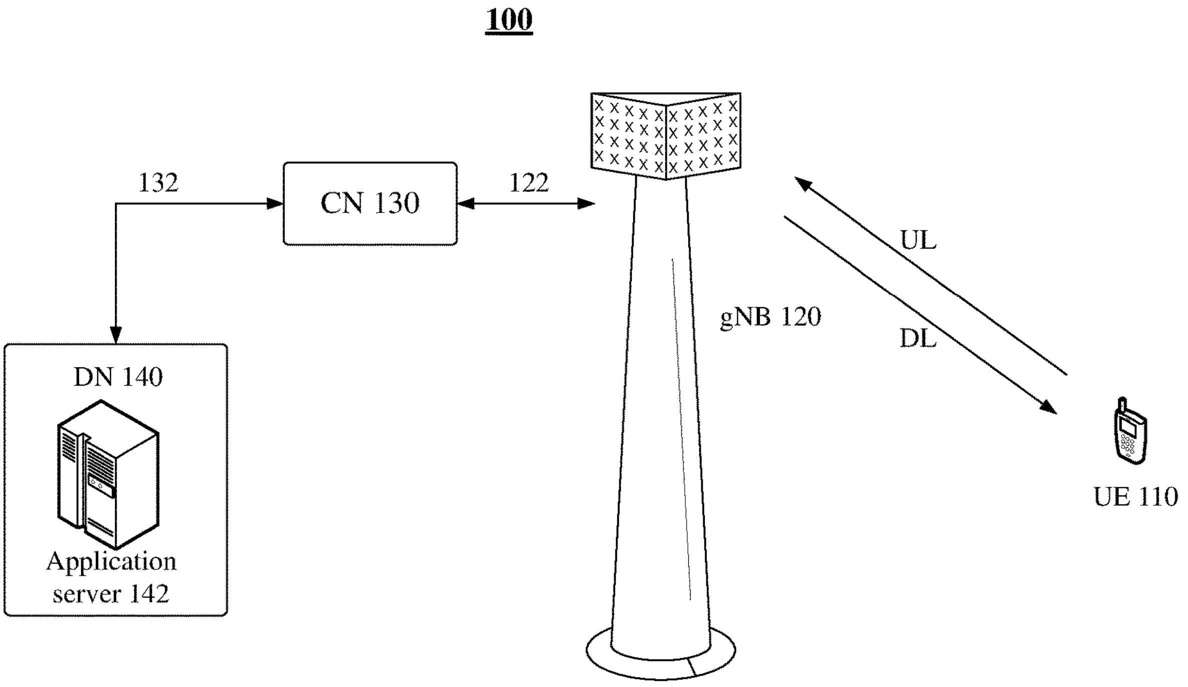
FIG. 1 is a schematic diagram illustrating a communication system in which example embodiments of the present application can be implemented.

FIG. 1 illustrates a schematic diagram of a communication system 100 in which aspects of the present disclosure may be performed. Referring to FIG. 1, the communication system 100, which may be a part of a larger network or system, may include a user equipment (UE) device 110, a base station 120, a core network (CN) 130, and a data network (DN) 140.

The UE 110, the base station 120 and the CN 130 may constitute a cellular communication network such as a 5G NR network, in which the UE 110 may be implemented as an NR-enabled UE, the base station 120 may be implemented as a next Generation Node-B (gNB), and the CN 130 may be implemented as a 5G core network (5GC). It would be appreciated that the NR network may comprise more than one UEs 110, more than one gNBs 120 and more than one CNs 130. The UE 110 may camp on a cell served by the gNB 120 and wirelessly communicate with the gNB 120 on uplink (UL) and downlink (DL) channels. The gNB 120 may connect to the CN 130 by a wireless or wired connection 122, for example by an optical fiber. Although not shown, the gNB 120 may also connect to other base stations via wireless or wired connections. The gNB 120 provides access to the network for the UE 110, and one or more gNBs 120 may also be referred to a random access network (RAN). The core network 130 may connect to a plurality of gNBs 120 and may provide coordination and control for the gNBs 120.

The data network 140, which may be a public data network such as the internet or a private data network such as an enterprise intranet, may connect to the core network 130 via a wireless or wired connection 132. For example, the data network 140 may connect to the core network 130 at one or more PDU session anchors (PSAs) (not shown). A plurality of application servers 142 may be deployed in the data network 140 to provide various services to customers. The application server 142 may be operated by a service provider (SP) such as an entertainment company that may provide for example an eXtended Reality (XR) service to customers. For example, the application server 142 may generate audio, video and/or haptic contents representing various real and virtual combined environments and distribute the contents to customers via the cellular communication network. Although not shown, the application server 142 may also connect to other devices such as one or more cameras, one or more microphones and one or more haptic sensors to collect real environmental data and/or user interaction data, which may be used to create the real and virtual combined contents.

The UE 110 may receive the XR service from the application server 142 via the cellular communication network for example the core network 130 and the gNB 120. The UE 110 may be implemented as for example an XR headset, an XR glasses, an XR cabin or other multimedia devices that include one or more speakers or earphones, one or more display panels and one or more haptic actuators to reproduce a real and virtual combined environment by playing the audio, video and/or haptic contents provided by the XR service. In some example embodiments, the UE 110 may also transmit audio, video, haptic and interaction data to the application server 142. For example, the UE 110 may include one or more microphones, one or more cameras, one or more haptic sensors and other sensors to capture environmental and interaction data. The UE 110 may also process for example encode, edit, combine and/or compress the captured data before transmitting the data to the application server 142.

For better customer experience, the XR service typically requires a high data rate for example up to 60 Mbps, a low latency for example up to 10 ms, and a high reliability for example up to 104. In addition, it would be desirable to reduce UE power consumption caused by the XR service. To meet the XR service requirements, the communication network needs to support broadband URLLC services (i.e. a combination of eMBB and URLLC) while minimizing power consumption of the UE 110. Since the XR service usually has a quasi-periodic traffic flow, semi-persistent scheduling (SPS) is considered as a suitable scheduling configuration for the XR traffic flow because the SPS can allocate a periodic pattern of resources for the XR traffic flow without dynamically scheduling each and every transmission by downlink control information (DCI) on a physical downlink control channel (PDCCH). As compared to the dynamic scheduling by the DCI on the PDCCH, the SPS can save PDCCH resources, reduce signaling overhead and save UE power consumption.

However, the XR traffic flow is observed to be quasi-periodic in the sense that arrival time of a packet or a packet group is varying from an expected time due to rendering, encoding as well as packet segmentation/core network processing of the traffic flow. The packet arrival time varying may be denoted by a jitter variable J, which may be in a certain range for example from −4 ms to +4 ms. When SPS is configured for the XR traffic flow, if one or more packets arrive too early before an SPS occasion, the packets have to be delayed until the SPS occasion, which would increase the latency of the traffic flow and negatively affect the random access network (RAN) perofrmance given the tight propagation delay budget (PDB) in downlinks of e.g. 10 ms. On the other hand, if one or more packets arrive later than a starting symbol of an SPS occasion or the gNB 120 has no time to process the pockets, the packets will miss the SPS occasion.

Figure 2:
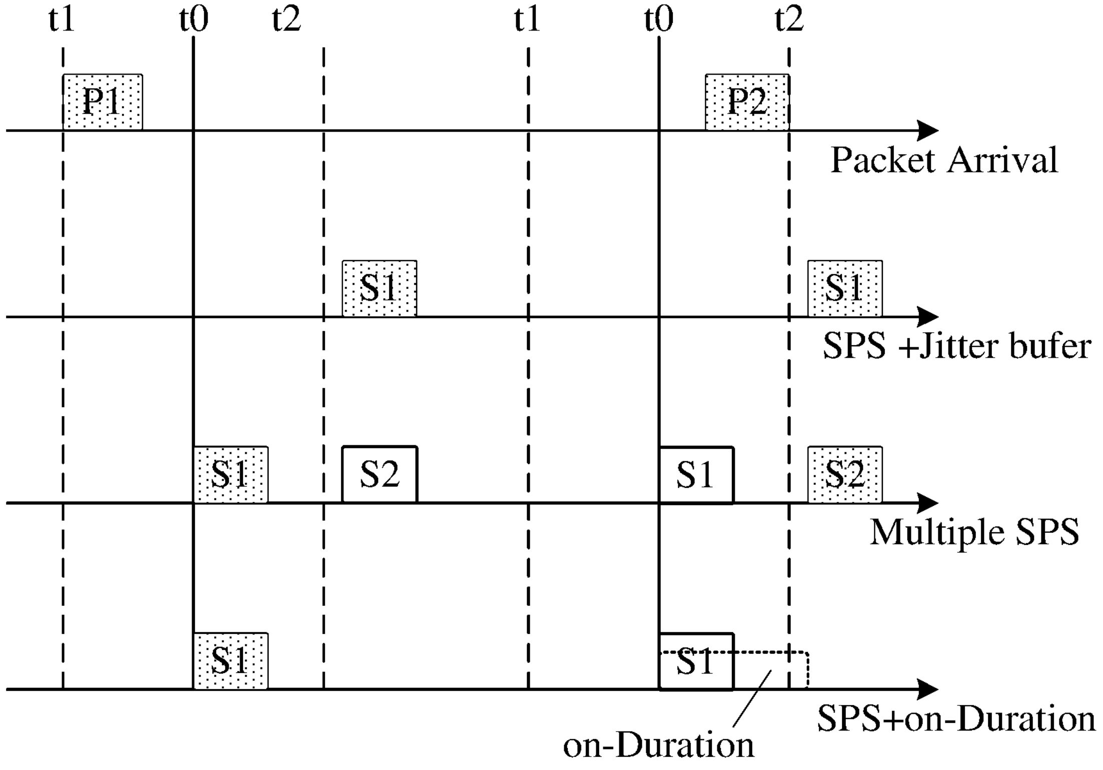
FIG. 2 is a schematic diagram illustrating semi-persistent scheduling (SPS) examples for an eXtended Reality (XR) application.

Some methods may be considered to adapt the SPS for the XR traffic flow, which are schematically shown in FIG. 2. Referring to FIG. 2, t0 represents an expected arrival time of one or more XR packets, and t1, t2 represent a jitter range of the XR packet arrival time, e.g., t1=t0−4 ms, t2=t0+4 ms. In FIG. 2, the first horizontal axis shows XR packets arrival time, the second to fourth horizontal axes show examples of SPS configurations.

Referring to the second horizontal axis in FIG. 2, one solution is to configure the SPS i.e. S1 to be later than the latest time instant t2 at which the XR packet may arrive and use a jitter buffer. If one or more XR packets arrive earlier than a corresponding SPS occasion S1, the packets may be temporarily stored in the jitter buffer. The gNB 120 may transmit the packets when the corresponding SPS occasion S1 comes and the UE 110 wakes up, supposing the UE 110 enters into a power saving mode in between adjacent SPS occasions. The solution has an obvious shortcoming that when the XR packet arrival time jitter J is large, the XR traffic flow would have a high transmission latency.

Another solution is to configure two or more SPSs for the XR traffic flow, as shown on the third horizontal axis in FIG. 2. The two SPS configurations, i.e. S1, S2, may be configured with the same periodicity matching the XR traffic flow but with different offset/timing. When a packet(s) arrives at the gNB 120, it would be transmitted on the nearest next SPS occasion. For example, if a packet(s) P1 arrives before the first SPS occasion S1, the packet(s) P1 would be transmitted on the first SPS occasion S1. If a packet(s) P2 arrives after the first SPS occasion S1 but before the second SPS occasion S2, the packet(s) P2 would be transmitted on the second SPS occasion S2. It would be appreciated that the second SPS S2 may be configured to be later than the latest time instant t2 at which the XR packet(s) may arrive and it functions as a redundant configuration for transmission of some late packets. However, this solution would cause unnecessary resource waste because the allocated SPS resources are two or more times of the resources that are actually needed for transmission of the XR traffic flow, depending on the number of the configured SPSs. In addition, when the packet arrival time jitter changes, the configured multiple SPSs may become no longer suitable.

As another solution shown on the fourth horizontal axis in FIG. 2, one SPS S1 is configured. When one or more XR packets P2 arrive later than a corresponding SPS occasion S1 and the gNB 120 cannot transmit the belated XR packets on the corresponding SPS occasion S1, the gNB 120 may force the UE 110 into an "on-Duration" mode by sending a DRX command MAC CE. During the on-Duration period, the UE 110 may keep monitoring a physical downlink control channel (PDCCH) to receive the belated XR packets on a physical downlink shared channel (PDSCH). Since the gNB 120 has no sense of XR packet arrival time variation, it needs to set the on-Duration period long enough to cover the largest packet arrival time jitter. The "on-Duration" parameter is a global parameter applicable to all UEs served by the cell and once configured it does not change dynamically. If the "on-Duration" parameter is set to have a long period, it would increase power consumption of all UEs camping on the cell, which is obviously unacceptable.

Hereinafter, example embodiments of SPS enhancement would be described in detail with reference to the accompanying drawings. The example embodiments of the SPS enhancement may be implemented to accommodate packet arrival time jitter in XR applications, and they are applicable to the largest arrival time jitter of the XR packets in a dynamic and configurable manner. The example embodiments can decrease unexpected delay of the XR packet transmissions, decrease unnecessary resource waste for the XR packet transmissions, and save UE power consumption for receiving the XR traffic flow.

Figure 3:
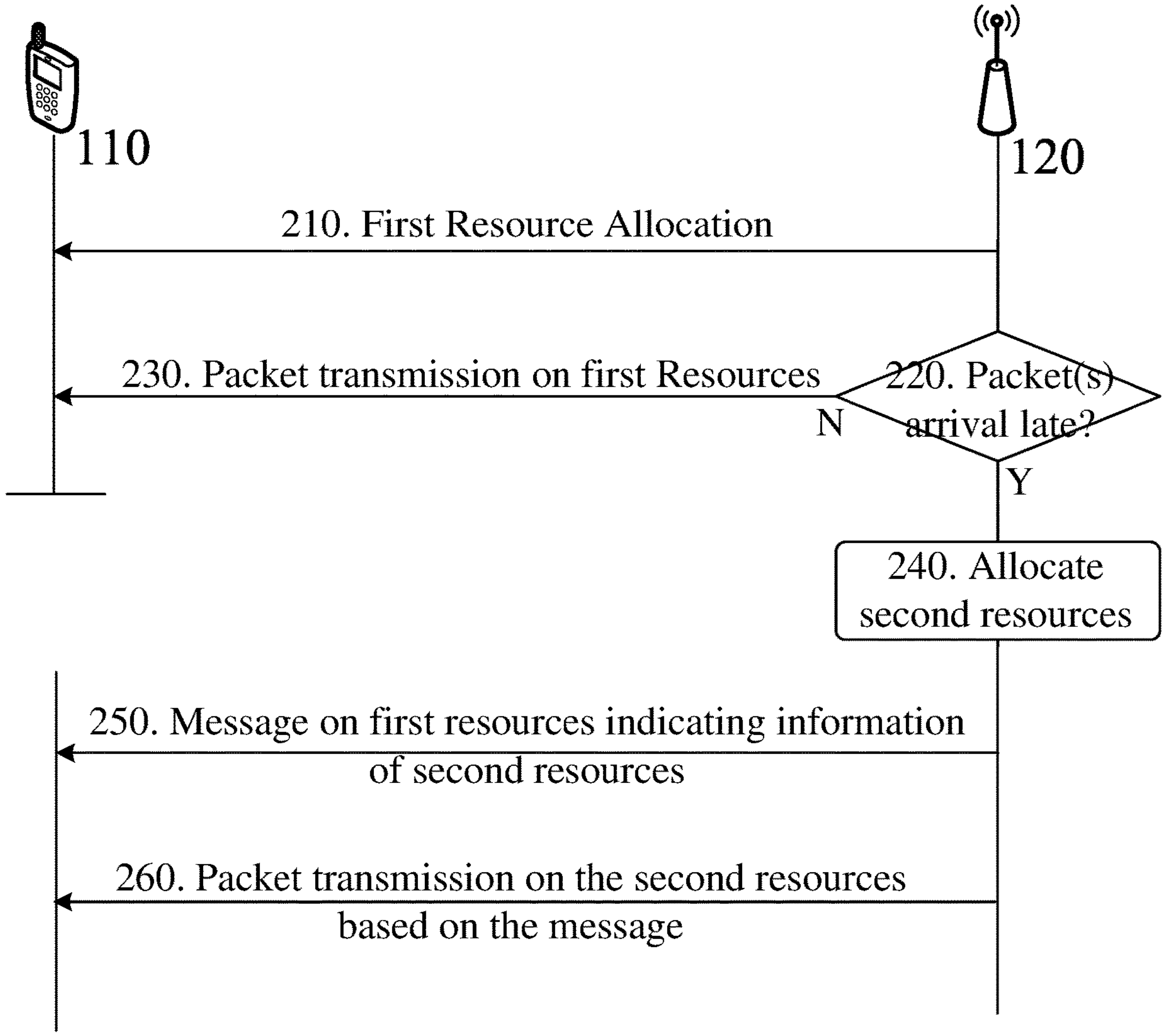
FIG. 3 is a signaling diagram illustrating operations for enhanced SPS scheduling according to an example embodiment.

FIG. 3 is a signaling diagram illustrating operations for enhanced SPS according to an example embodiment. The operations shown in FIG. 3 may be performed by a user equipment device and a base station in a communication network, such as the UE 110 and the gNB 120 in the cellular communication network described above with reference to FIG. 1. For example, the UE 110 and the gNB 120 may include a plurality of means for performing the operations discussed below with reference to FIG. 3. The means may be implemented in various manners, including software, hardware, firmware, or any combination thereof to perform the operations. It would also be appreciated that XR applications are discussed here as an example, but the example embodiments of the SPS enhancement are not limited to XR applications.

Figure 4:
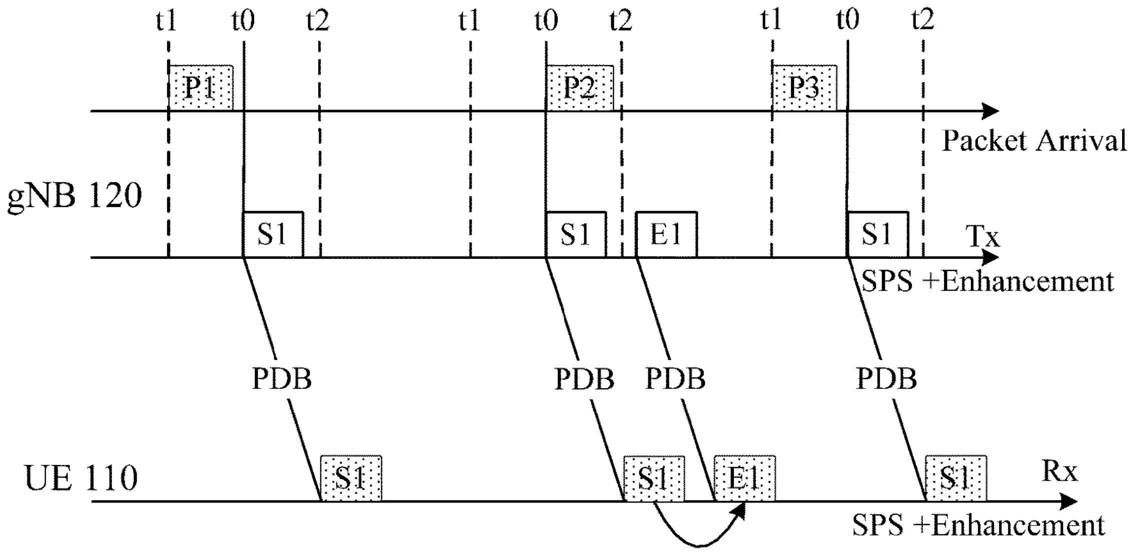
FIG. 4 is a schematic diagram illustrating the enhanced SPS scheduling according to an example embodiment.

Referring to FIG. 3, at 210, the UE 110 may receive from the gNB 120 a first resource allocation for a traffic flow of a service provided via the communication network. In some example embodiments, the traffic flow may provide an XR service, and the gNB 120 may allocate the first resources for the XR traffic flow by SPS. For example, the gNB 120 may configure SPS parameters such as periodicity and SPS C-RNTI by RRC signaling and activate the SPS configuration by downlink control information (DCI) carried on the PDCCH. An example of the SPS enhancement is also shown in FIG. 4. Referring to FIG. 4, the first SPS resources S1 are allocated for the XR traffic flow, and in the time domain the first SPS resources S1 may be generally aligned to the expected packet arrival time of the XR traffic flow.

At 220, the gNB 120 may determine if a packet or a part of packets in the XR traffic flow arrive late for a corresponding occasion of the allocated first SPS resources. For example, if a packet or a part of packets, which may be transmitted from the core network 130, do not arrive at the gNB 120 before a starting symbol of an SPS occasion, or the gNB 120 is unable to process the packet(s) in time, the gNB 120 would determine that the packet(s) are late for using the corresponding SPS occasion.

If the gNB 120 determines at the operation 220 that the packet(s) in the XR traffic flow arrives at the gNB 120 before the corresponding occasion of the allocated first SPS resources, then the gNB 120 would transmit the packet(s) on the corresponding occasion of the allocated first SPS resources at 230. For example, referring to FIG. 4, a first packet(s) P1 arrives before a first occasion of the allocated SPS resources S1, then the gNB 120 transmits the first packet(s) P1 on the first SPS occasion. Also, a third packet(s) P3 arrives before a third occasion of the allocated SPS resources S1, then the gNB 120 transmits the third packet(s) P3 on the third SPS occasion. In some example embodiments, when the UE 110 successfully receives the packet(s) on the SPS occasion, the UE 110 may enter a power saving mode until a next SPS occasion.

If the gNB 120 determines at the operation 220 that a packet or a part of packets are late for transmission using the corresponding occasion of the allocated first SPS resources, then the gNB 120 may allocate second resources for transmission of the one or more belated packets at 240. For example, referring to FIG. 4, a second packet(s) P2 arrives at the gNB 120 after the second occasion of the allocated SPS resources S1 (i.e., after the starting symbol of the second SPS occasion), then the gNB 120 may allocate the second resources E1 for transmission of the second packet(s) P2 at the operation 240.

At 250, the gNB 120 may transmit a message indicating information relating to the second resources allocated for transmission of the one or more belated packets in the XR traffic flow to the UE 110. As the gNB 120 cannot transmit the one or more belated packets on the corresponding SPS occasion, the gNB 120 uses the message to inform the UE 110 of information about the transmission of the one or more belated packets. The message may be transmitted on the occasion of the allocated first SPS resources corresponding to the one or more belated packets. For example, referring to FIG. 4, when the second packet(s) P2 is late for the second SPS occasion S1 and the gNB 120 allocates the second resources E1 for the belated second packet(s) P2, the gNB 120 may transmit the message indicating information relating to the second resources allocated for the transmission of the belated second packet(s) P2 on the second SPS occasion S1. The message may indicate the specific second resources allocated for the transmission of the one or more belated packets or other information relating to the second resources that helps the UE 110 receive the one or more belated packets on the second resources. Some examples of the message will be described in detail later.

In some example embodiments, the gNB 120 may receive from the core network 130 a first part of a group of packets before an occasion of the allocated first SPS resources corresponding to the group of packets, but a remaining part of the group of packets does not arrive at the gNB 120 before the corresponding occasion of the allocated first SPS resources. As discussed above, the gNB 120 may allocate second resources for the belated remaining part of the group of packets at the operation 240. Then at the operation 250, the gNB 120 may transmit the message associated with transmission of the remaining part of the group of packets as well as the received first part of the group of packets on the occasion of the allocated first SPS resources corresponding to the group of packets.

In some example embodiments, the message indicating information relating to the second resources for the transmission of the one or more belated packets may be transmitted via a new defined MAC CE or downlink control information (DCI). The DCI carrying the message may be transmitted using the SPS PDSCH resources. In some example embodiments, the message indicating information relating to the second resources for the transmission of the one or more packets may be transmitted via a radio resource control (RRC) signaling. Some examples of the message will be described in detail below.

At 260, the UE 110 may receive the one or more packets from the gNB 120 in accordance with the message. The gNB 120 may transmit the one or more packets using the allocated second resources. For example, referring to FIG. 4, the gNB 120 may transmit the belated second packet(s) P2 using the second resources E1. Since the UE 110 has received on the second SPS occasion the message indicating information relating to the second resources for the transmission of the second packet(s) P2 at the operation 250, the UE 110 can receive the second packet(s) P2 on the second resources E1 based on the message at the operation 260.

FIGS. 5, 6, 7, 8 are signaling diagrams illustrating operations for transmission of the one or more belated packets based on the enhanced SPS scheduling according to some example embodiments. It would be appreciated that the operations shown in FIGS. 5-8 represent some examples of the operations 250, 260 discussed above with reference to FIG. 3 and can be incorporated into the procedure shown in FIG. 3 by replacing the operations 250, 260.

Figure 5:
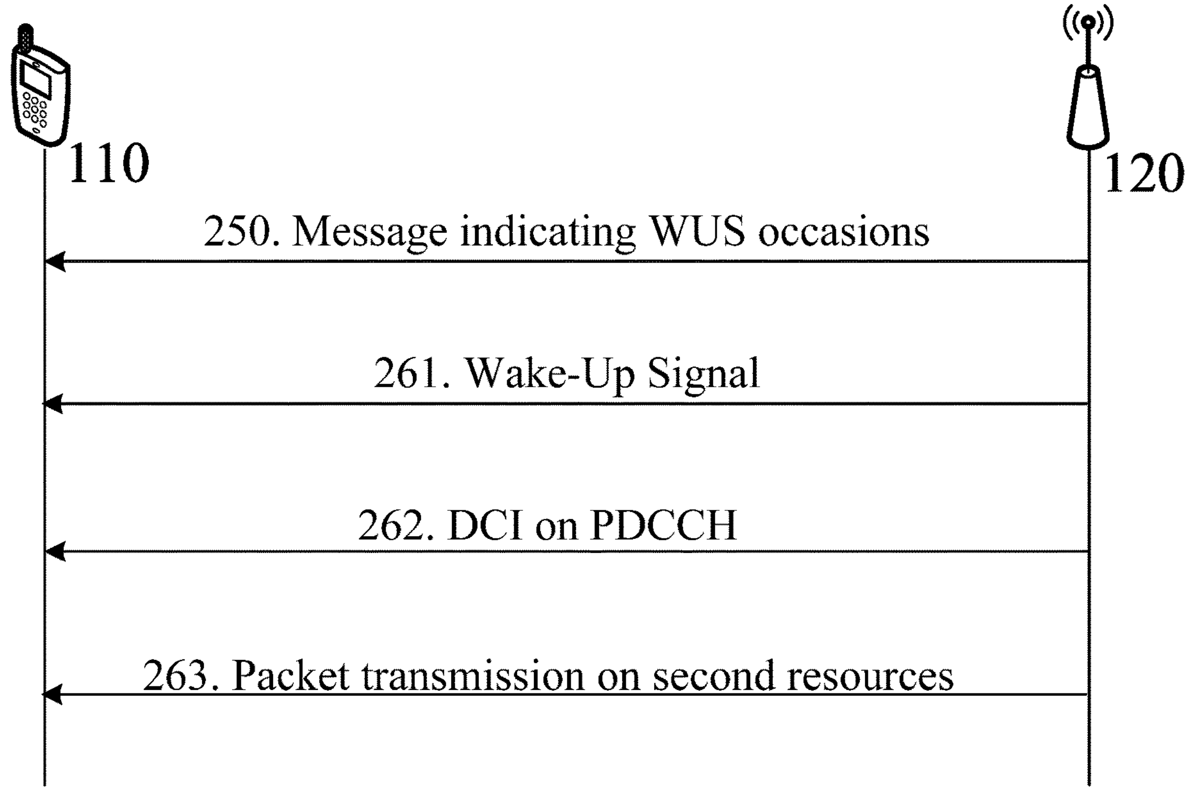
FIG. 5 is a signaling diagram illustrating operations for enhanced SPS scheduling according to an example embodiment.

Referring to FIG. 5, at the operation 250, the message indicating information relating to the second resources for the transmission of the one or more packets in the XR traffic flow may comprise an indication of one or more occasions to monitor a wake-up signal (WUS). The WUS signal may implicitly indicate to the UE 110 that the gNB 120 will transmit the one or more belated packets on the second resources soon. In some example embodiments, the message may indicate a number of slots with a starting slot to monitor the WUS signal. The message may further indicate an interval where the UE 110 does not need to monitor the WUS signal. For example, the message may indicate that the UE 110 shall monitor the WUS signal from a first slot after the SPS occasion to a fifth slot, and the UE 110 shall monitor first one of every two slots. The gNB 120 may determine the starting slot, the number of slots, and the interval based on its knowledge of arrival time or jitter range of the XR packets. In an example, if the message does not specify the number of slots and the interval, the UE 110 may monitor every slot from the starting slot until the next SPS occasion. In another example, if the message does not specify the starting slot, the UE 110 may monitor the WUS signal from the first slot after the SPS occasion.

At 261, the gNB 120 may transmit the WUS signal to the UE 110 at one of the one or more occasions indicated in the message transmitted at the operation 250. The UE 110 may include a WUS receiver to monitor the WUS signal at the one or more occasions indicated in the message. The WUS receiver can detect the WUS signal by simple time domain correlation energy detection. As compared to blind decoding of the PDCCH, the WUS receiver can provide advantages of lower latency and less power consumption.

At 262, once the WUS signal is detected, the UE 110 may monitor a control channel such as the PDCCH to check whether downlink control information (DCI) is carried on the PDCCH indicating the second resources for transmission of the one or more packets. The gNB 120 may transmit the DCI on the PDCCH after the WUS signal.

At 263, if the UE 110 successfully decodes the DCI indicating the second resources, then the UE 110 may receive the one or more belated packets on the second resources.

Figure 6:
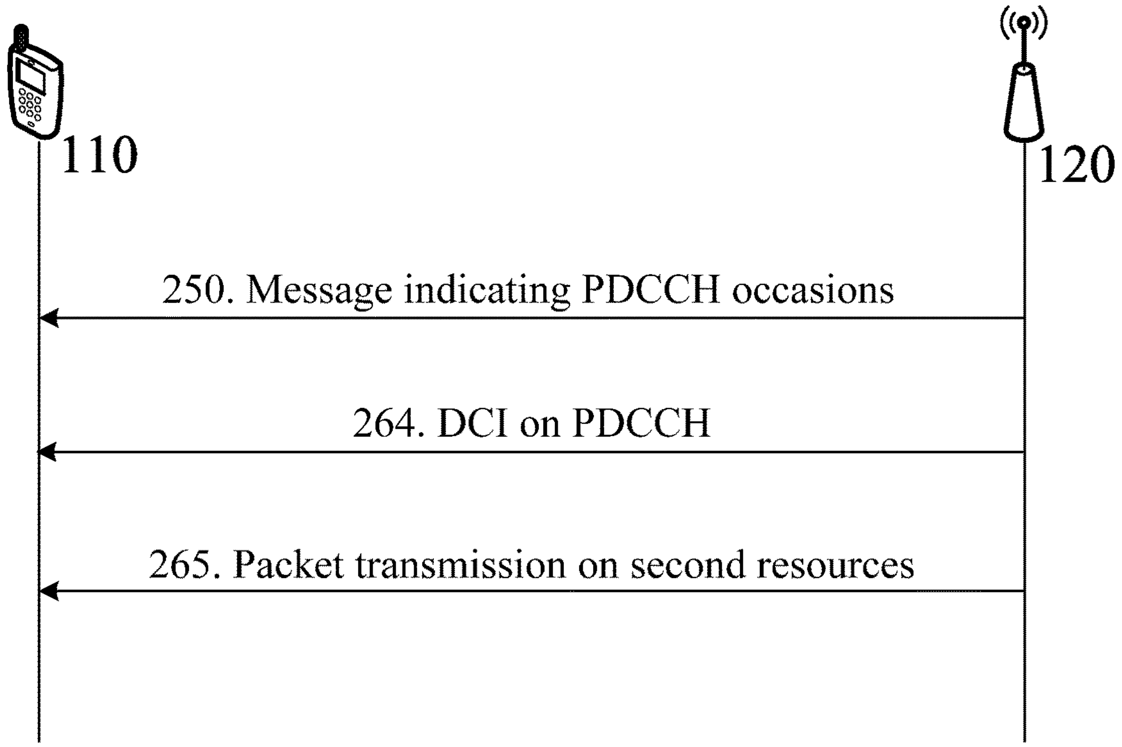
FIG. 6 is a signaling diagram illustrating operations for enhanced SPS scheduling according to another example embodiment.

In the procedure shown in FIG. 5, the gNB 120 sends the WUS signal before it transmits the one or more packets using the second resources. The UE 110 starts monitoring the PDCCH after it receives the WUS signal. As discussed above, it may save UE power consumption for the PDCCH monitoring. FIG. 6 shows another procedure where the WUS signal may be omitted. The gNB 120 may inform the UE 110 of one or more occasions for monitoring the PDCCH associated with the transmission of the one or more belated packets, which can also save UE power consumption because it can reduce PDCCH blind decoding times at the UE 110.

Referring to FIG. 6, at the operation 250, the message indicating information relating to the second resources for the transmission of the one or more packets in the XR traffic flow may comprise an indication of one or more occasions to monitor a control channel such as the PDCCH associated with the transmission of the one or more belated packets. PDCCH occasions may be defined in a core resource set (CORESET) and a search space, the message transmitted at the operation 250 may indicate to the UE 110 which PDCCH occasions shall be monitored. For example, the message may indicate a starting PDCCH occasion, a number of PDCCH occasions and an interval for monitoring the PDCCH. As a specific example, the message may indicate that the UE 110 shall monitor the PDCCH from the first PDCCH occasion after the SPS occasion until the tenth PDCCH occasion, and the UE 110 shall monitor the first one of every two PDCCH occasions. The gNB 120 may determine the starting PDCCH occasion, the number of PDCCH occasions and the interval based on its knowledge of expected arrival time or jitter range of the XR packets. For example, if a part of packets arrives at the gNB 120 before the SPS occasion, the gNB 120 may infer that a remaining part of the packets will arrive soon and thus determine the starting occasion for monitoring the PDCCH as the first PDCCH occasion after the SPS occasion. If the gNB 120 does not receive any packet before the SPS occasion and it cannot predict when the packet(s) will arrive, the gNB 120 may determine the number of PDCCH monitoring occasions large enough for possibly latest transmission of the belated packets. In an example, if the message does not specify the number of PDCCH occasions and the interval, the UE 110 may monitor every PDCCH occasion from the starting PDCCH occasion until the next SPS occasion. In another example, if the message does not specify the starting PDCCH occasion, the UE 110 may monitor the PDCCH from the first PDCCH occasion after the SPS occasion.

At 264, the UE 110 may monitor the PDCCH according to the message received at the operation 250. The gNB 120 may transmit the PDCCH at one of the one or more PDCCH occasions indicated in the message. The UE 110 may monitor the PDCCH to check whether downlink control information (DCI) is carried on the PDCCH indicating the second resources for transmission of the one or more packets.

At 265, if the UE 110 successfully decodes the DCI indicating the second resources, then the UE 110 may receive the one or more belated packets transmitted on the PDSCH using the second resources.

Figure 7:
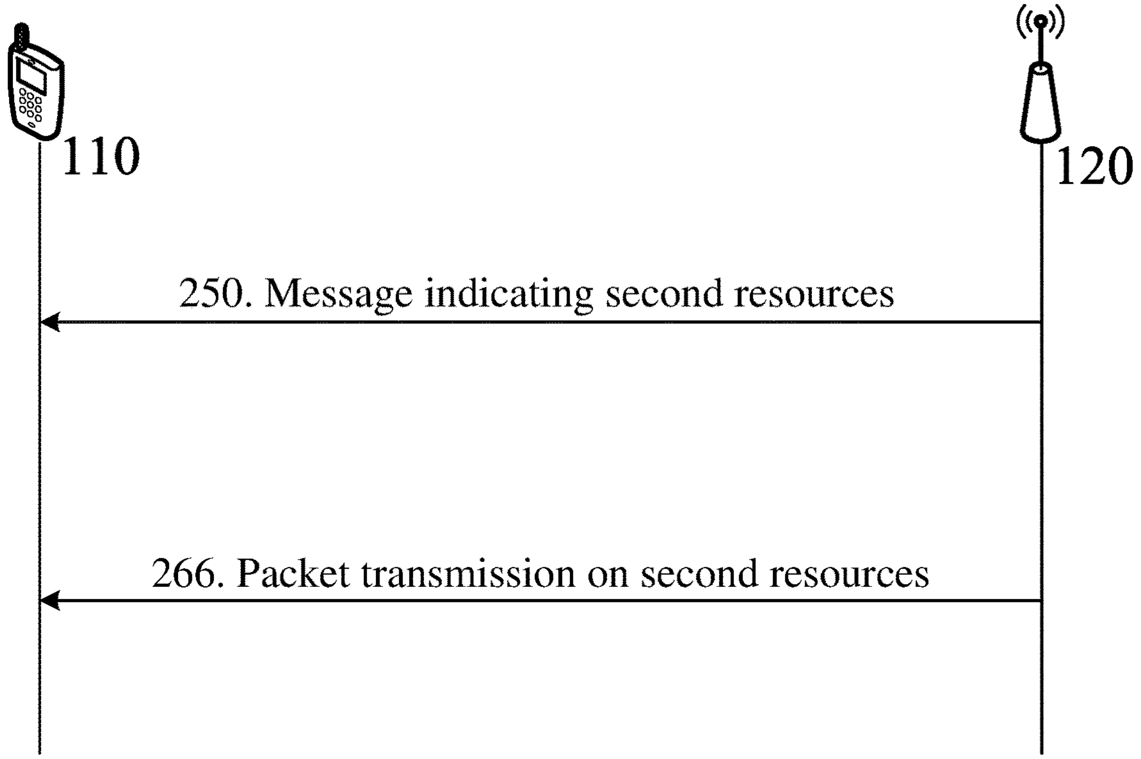
FIG. 7 is a signaling diagram illustrating operations for enhanced SPS scheduling according to another example embodiment.

FIG. 7 shows another example embodiment where the gNB 120 may informs the UE 110 of the specific second resources allocated for transmission of the one or more packets at the operation 250. In the example embodiment, the UE 110 does not need to decode DCI on the PDCCH. Referring to FIG. 7, at the operation 250, the message transmitted from the gNB 120 to the UE 110 may indicate the specific second resources allocated to the one or more belated packets. For example, if one or more packets does not arrive at the gNB 120 before the SPS occasion but the gNB 120 can estimate when the one or more belated packets would arrive, the gNB 120 may indicate in the message the resources for transmission of the one or more belated packets. In some example embodiments, the message may include at least time domain information of the second resources, for example the slot(s) for the PDSCH carrying the one or more packets. Optionally the message may further include frequency domain information of the second resources, for example the subcarrier(s) for the PDSCH carrying the one or more packets. If the frequency domain information of the second resources is absent in the message, the UE 110 may infer that the second resources have the same frequency domain resource allocation as the first SPS resources allocated for the XR traffic flow. In some example embodiments, the message may further indicate a modulation coding scheme (MCS) of the one or more packets transmitted using the second resources. If the modulation coding scheme is absent in the message, the UE 110 may infer that the modulation coding scheme for packet transmission using the second resources is the same as the packet transmissions using the first SPS resources.

At 266, the UE 110 may receive from the gNB 120 the one or more packets on the second resources according to the message.

Figure 8:
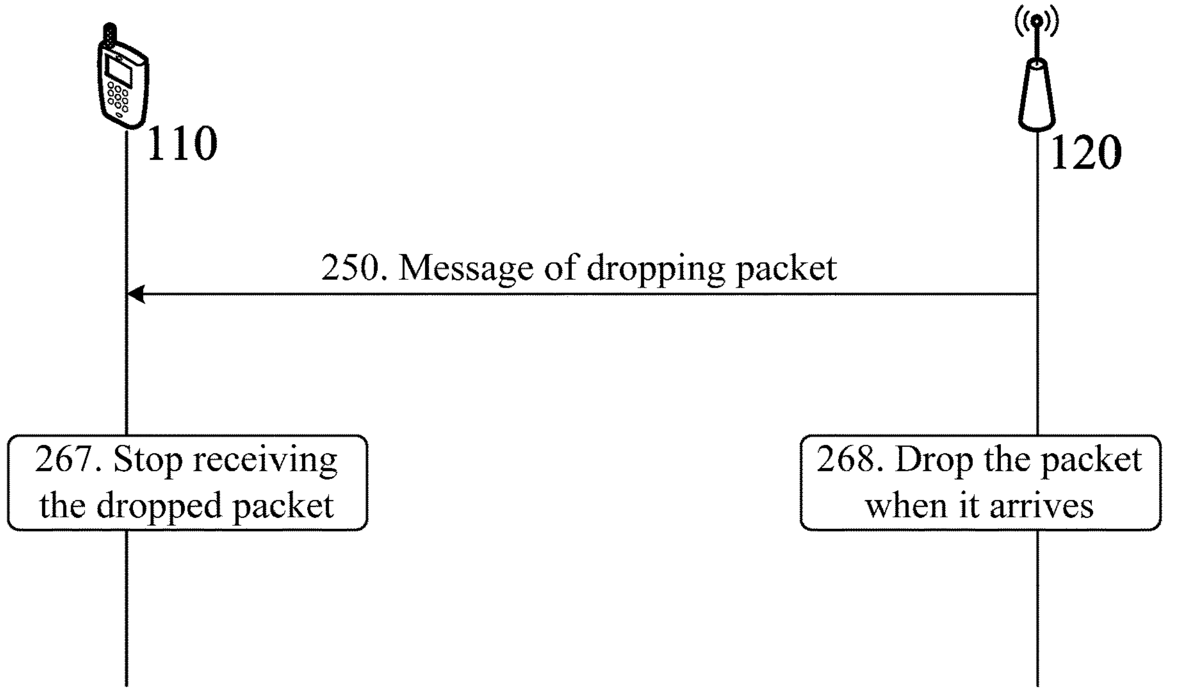
FIG. 8 is a signaling diagram illustrating operations for enhanced SPS scheduling according to another example embodiment.

FIG. 8 shows another example embodiment where the one or more belated packets may be dropped. Referring to FIG. 8, at the operation 250, the message transmitted from the gNB 120 to the UE 110 may indicate that the gNB 120 would drop the one or more belated packets intended to the UE 110. The gNB 120 would not transmit the one or more belated packets on second resources even when the one or more belated packets eventually arrive at the gNB 120.

Then at 267, the UE 110 may stop receiving the one or more belated packets. For example, the UE 110 may enter a power saving mode until the next SPS occasion.

At 268, if the one or more belated packets arrive at the gNB 120, the gNB 120 does not need to transmit the one or more packets to the UE 110, but drops them. In some cases, when the gNB 120 decides to abandon the one or more belated packets, the gNB 120 does not need to allocate the second resources for the one or more belated packets.

The above described some example embodiments of transmission and reception of the belated XR packets. It would be appreciated that in the above example embodiments, the belated packets may be transmitted in a flexible, power saving and low latency way, and it would not impact transmission of on-time packets or other UEs in the cell. The principle of the example embodiments may also be applicable to other applications in addition to the XR applications.

Figure 9:
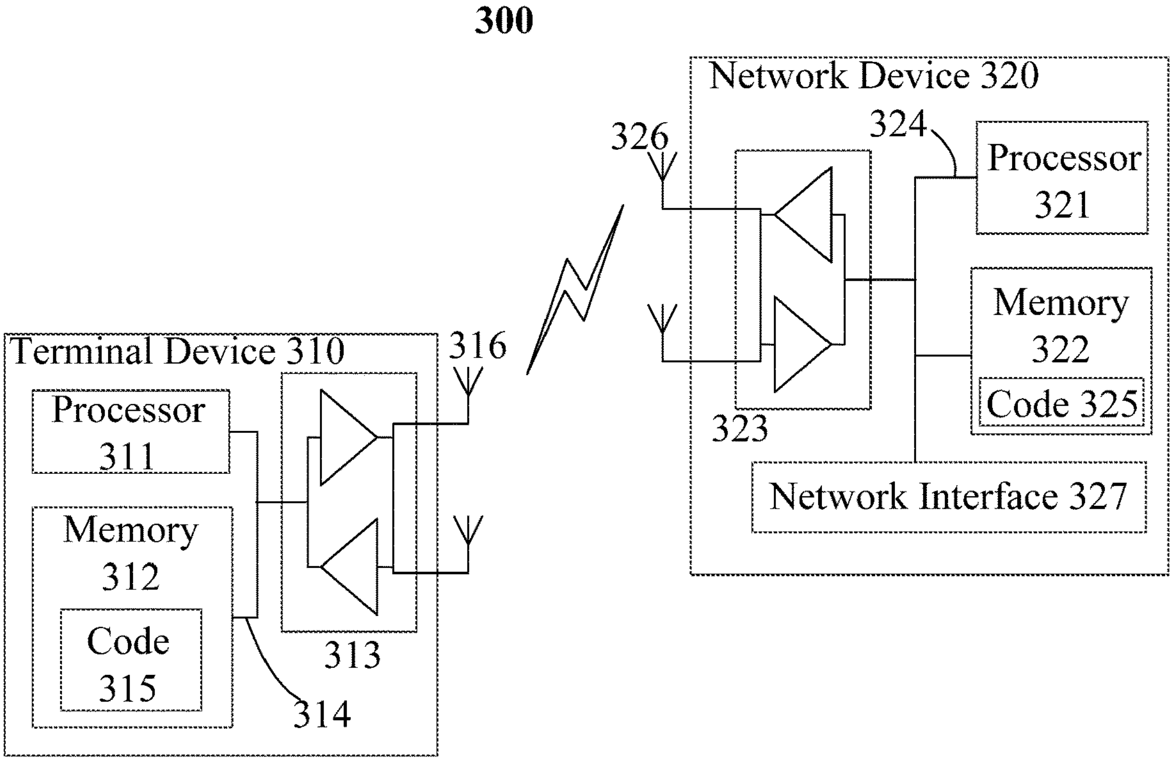
FIG. 9 illustrates a block diagram of a communication network in which example embodiments of the present disclosure can be implemented.

FIG. 9 is a block diagram illustrating a communication network 300 in which example embodiments of the present disclosure can be implemented. The communication network 300 may be a part of a larger communication network or system. As shown in FIG. 9, the communication network 300 may include a terminal device 310 which may be implemented as the UE 110 discussed above, and a network device 320 which may be implemented as the base station (gNB) 120 discussed above.

Referring to FIG. 9, the terminal device 310 may comprise one or more processors 311, one or more memories 312 and one or more transceivers 313 interconnected through one or more buses 314. The one or more buses 314 may be address, data, or control buses, and may include any interconnection mechanism such as series of lines on a motherboard or integrated circuit, copper cables, optical fibers, or other electrical/optical communication equipment, and the like. Each of the one or more transceivers 313 may comprise a receiver and a transmitter, which are connected to a plurality of antennas 316. The plurality of antennas 316 may form an antenna array to perform beamforming communication with the network device 320. The one or more memories 312 may include computer program code 315.

The one or more memories 312 and the computer program code 315 may be configured to, when executed by the one or more processors 311, cause the terminal device 310 to perform operations and procedures relating to the UE 110 as described above.

The network device 320 may be implemented as a single network node, or disaggregated/distributed over two or more network nodes, such as a central unit (CU), a distributed unit (DU), a remote radio head-end (RRH), using different functional-split architectures and different interfaces. The network device 320 may comprise one or more processors 321, one or more memories 322, one or more transceivers 323 and one or more network interfaces 327 interconnected through one or more buses 324. The one or more buses 324 may be address, data, or control buses, and may include any interconnection mechanism such as a series of lines on a motherboard or integrated circuit, copper cables, optical fibers, or other electrical/optical communication equipment, and the like. Each of the one or more transceivers 323 may comprise a receiver and a transmitter, which are connected to a plurality of antennas 326. The network device 320 may operate as a base station for the terminal device 310 and wirelessly communicate with the terminal device 310 through the plurality of antennas 326. The plurality of antennas 326 may form an antenna array to perform beamforming communication with the terminal device 310. The one or more network interfaces 327 may provide wired or wireless communication links through which the network device 320 may communicate with other network devices, entities or functions. The one or more memories 322 may include computer program code 325. The one or more memories 322 and the computer program code 325 may be configured to, when executed by the one or more processors 321, cause the network device 320 to perform operations and procedures relating to the base station (gNB) 120 as described above.

The one or more processors 311, 321 discussed above may be of any appropriate type that is suitable for the local technical network, and may include one or more of general purpose processors, special purpose processor, microprocessors, a digital signal processor (DSP), one or more processors in a processor based multi-core processor architecture, as well as dedicated processors such as those developed based on Field Programmable Gate Array (FPGA) and Application Specific Integrated Circuit (ASIC). The one or more processors 311, 321 may be configured to control other elements of the UE/network device and operate in cooperation with them to implement the procedures discussed above.

The one or more memories 312, 322 may include at least one storage medium in various forms, such as a volatile memory and/or a non-volatile memory. The volatile memory may include but not limited to for example a random access memory (RAM) or a cache. The non-volatile memory may include but not limited to for example a read only memory (ROM), a hard disk, a flash memory, and the like. Further, the one or more memories 312, 322 may include but not limited to an electric, a magnetic, an optical, an electromagnetic, an infrared, or a semiconductor system, apparatus, or device or any combination of the above.

It would be understood that blocks in the drawings may be implemented in various manners, including software, hardware, firmware, or any combination thereof. In some example embodiments, one or more blocks may be implemented using software and/or firmware, for example, machine-executable instructions stored in the storage medium. In addition to or instead of machine-executable instructions, parts or all of the blocks in the drawings may be implemented, at least in part, by one or more hardware logic components. For example, and without limitation, illustrative types of hardware logic components that can be used include Field-Programmable Gate Arrays (FPGAs), Application-Specific Integrated Circuits (ASICs), Application-Specific Standard Products (ASSPs), System-on-Chip systems (SOCs), Complex Programmable Logic Devices (CPLDs), etc.

Some example embodiments further provide computer program code or instructions which, when executed by one or more processors, may cause a device or apparatus to perform the procedures described above. The computer program code for carrying out procedures of the example embodiments may be written in any combination of one or more programming languages. The computer program code may be provided to one or more processors or controllers of a general purpose computer, special purpose computer, or other programmable data processing apparatus, such that the program code, when executed by the processor or controller, cause the functions/operations specified in the flowcharts and/or block diagrams to be implemented. The program code may execute entirely on a machine, partly on the machine, as a stand-alone software package, partly on the machine and partly on a remote machine or entirely on the remote machine or server.

Some example embodiments further provide a computer program product or a computer readable medium having the computer program code or instructions stored therein. The computer readable medium may be any tangible medium that may contain, or store a program for use by or in connection with an instruction execution system, apparatus, or device. The machine readable medium may be a machine readable signal medium or a machine readable storage medium. A machine readable medium may include but is not limited to an electronic, magnetic, optical, electromagnetic, infrared, or semiconductor system, apparatus, or device, or any suitable combination of the foregoing. More specific examples of the machine readable storage medium would include an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing.

While operations are depicted in a particular order in the drawings, it should not be understood as requiring that such operations be performed in the particular order shown or in sequential order, or that all illustrated operations be performed, to achieve desirable results. In certain circumstances, multitasking and parallel processing may be advantageous. Likewise, while several specific implementation details are contained in the above discussions, these should not be construed as limitations on the scope of the present disclosure, but rather as descriptions of features that may be specific to particular example embodiments. Certain features that are described in the context of separate example embodiments may also be implemented in combination in a single example embodiment. Conversely, various features that are described in the context of a single example embodiment may also be implemented in multiple example embodiments separately or in any suitable sub-combination.

Although the subject matter has been described in a language that is specific to structural features and/or method actions, it is to be understood the subject matter defined in the appended claims is not limited to the specific features or actions described above. On the contrary, the above-described specific features and actions are disclosed as an example of implementing the claims.

The invention claimed is:

1. A terminal device in a communication network, comprising:

at least one processor; and at least one memory including program code, the at least one memory and the program code configured to, with the at least one processor, cause the terminal device to perform at least:

receive from a network device in the communication network, allocation of first resources for a traffic flow of a service provided via the communication network, wherein the first resources are allocated by semi-persistent scheduling;

receive on the first resources, a message indicating information relating to second resources allocated for transmission of at least one packet in the traffic flow of the service to accommodate packet arrival time jitter; and receive on the second resources, the at least one packet in accordance with the message.

2. The terminal device of claim 1, wherein the message comprises at least one of the following:

a radio resource control signaling;

a medium access control control element; or downlink control information.

3. The terminal device of claim 1, wherein the message comprises an indication of one or more occasions for monitoring a wake-up signal.

4. The terminal device of claim 3, wherein receiving the at least one packet in accordance with the message comprises:

monitoring the wake-up signal at the one or more occasions;

monitoring a control channel for downlink control information when the wake-up signal is detected, the downlink control information indicating the second resources for the transmission of the at least one packet; and receiving the at least one packet on the second resources.

5. The terminal device of claim 1, wherein the message comprises an indication of one or more occasions for monitoring a control channel associated with the transmission of the at least one packet.

6. The terminal device of claim 5, wherein receiving the at least one packet in accordance with the message comprises:

monitoring at the one or more occasions the control channel for downlink control information, the downlink control information indicating the second resources for the transmission of the at least one packet; and receiving the at least one packet on the second resources.

7. The terminal device of claim 1, wherein the message comprises information of the second resources for the transmission of the at least one packet.

8. The terminal device of claim 7, wherein receiving the at least one packet in accordance with the message comprises:

receiving the at least one packet on the second resources.

9. The terminal device of claim 7, wherein the message further comprises information of a modulation coding scheme for the transmission of the at least one packet.

10. The terminal device of claim 4, wherein the second resources are allocated by the network device when the at least one packet in the traffic flow is late for using the first resources.

11. The terminal device of claim 1, wherein the message comprises an indication that the at least one packet is dropped.

12. The terminal device of claim 11, wherein receiving the at least one packet in accordance with the message comprises:

stopping receiving the at least one packet that is dropped.

13. A network device in a communication network, comprising:

at least one processor; and at least one memory including program code, the at least one memory and the program code configured to, with the at least one processor, cause the network device to perform at least:

allocate first resources for a traffic flow of a service provided via the communication network to a terminal device in the communication network, wherein the first resources are allocated by semi-persistent scheduling;

allocate second resources for transmission of at least one packet in the traffic flow;

transmit to the terminal device, on the first resources a message indicating information relating to the second resources allocated for the transmission of the at least one packet to accommodate packet arrival time jitter; and transmit to the terminal device, on the second resources the at least one packet in accordance with the message.

14. The network device of claim 13, wherein the second resources are allocated when the at least one packet in the traffic flow is late for using the first resources.

15. The network device of claim 13, wherein the message comprises at least one of the following:

a radio resource control signaling;

a medium access control control element; or downlink control information.

16. The network device of claim 13, wherein the message comprises an indication of one or more occasions for monitoring a wake-up signal.

17. The network device of claim 16, wherein transmitting the at least one packet in accordance with the message comprises:

transmitting the wake-up signal at one of the one or more occasions;

transmitting downlink control information on a control channel after transmitting the wake-up signal, the downlink control information indicating the second resources for the transmission of the at least one packet; and transmitting the at least one packet on the second resources.

18. The network device of claim 13, wherein the message comprises an indication of one or more occasions for monitoring a control channel associated with the transmission of the at least one packet.

19. The terminal device of claim 3, wherein the message indicates an interval where the terminal device does not need to monitor the wake-up signal.

20. The terminal device of claim 19, wherein the interval is based on the packet arrival time jitter.

* * * * *